United States Patent
Okamoto et al.

(10) Patent No.: US 6,838,018 B2
(45) Date of Patent: Jan. 4, 2005

(54) LIQUID CRYSTALLINE POLYESTER RESIN COMPOSITION AND ITS MOLDED ARTICLE

(75) Inventors: Satoshi Okamoto, Ibaraki (JP); Manabu Hirakawa, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/387,842

(22) Filed: Mar. 14, 2003

(65) Prior Publication Data

US 2003/0193039 A1 Oct. 16, 2003

(30) Foreign Application Priority Data

Mar. 27, 2002 (JP) ........................................ 2002-088569

(51) Int. Cl.$^7$ ........................ C09K 19/38; C09K 19/54; C09K 19/52; C08L 67/00
(52) U.S. Cl. .............................. 252/299.01; 252/299.5; 524/539; 524/601; 524/604; 524/605
(58) Field of Search ................... 252/299.01, 299.62, 252/299.67, 299.5; 524/539, 601, 604.605, 495, 496

(56) References Cited

U.S. PATENT DOCUMENTS 6,280,668 B1 * 8/2001 Saito et al. ................. 264/108

FOREIGN PATENT DOCUMENTS

| JP | 3-62847 | * | 3/1991 |
| JP | 04-318058 A | | 11/1992 |
| JP | 2003-96279 | * | 4/2003 |

OTHER PUBLICATIONS

English abstract for JP 03062847, 1991.*
English abstract for JP 04318058, 1992.*
English abstract for JP 2003096279, 2003.*

* cited by examiner

Primary Examiner—Shean C. Wu
(74) Attorney, Agent, or Firm—Foley & Lardner LLP

(57) ABSTRACT

An object of the present invention is to provide a liquid crystalline polyester resin composition to produce a molded article without generating black foreign materials even if exposed to high temperature. This object is achieved by providing a liquid crystalline polyester resin composition comprising a liquid crystalline polyester and at least one phosphite compound of the formula (I):

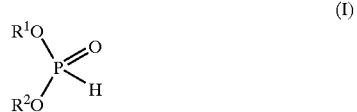

wherein, $R^1$ represents a hydrogen atom or, an alkyl group having 1 to 4 carbon atoms or a phenyl group, and $R^2$ represents an alkyl group having 1 to 4 carbon atoms or a phenyl group.

14 Claims, No Drawings

LIQUID CRYSTALLINE POLYESTER RESIN COMPOSITION AND ITS MOLDED ARTICLE

FIELD OF THE INVENTION

The present invention relates to a liquid crystalline polyester resin composition.

BACKGROUND OF THE INVENTION

Liquid crystalline polyesters are widely used in various electric and electronic fields because of excellent electric and mechanical properties and also excellent processability. However, with enlargement and diversification of application, molding process or treatment after molding process sometimes conducted under high temperature conditions, and therefore, high heat resistant stability is desired.

For example, JP No. 4-318058A discloses a liquid crystalline polyester composition containing 2,2-methylenebis (4,6-di-t-butylphenyl) octyl phosphite as a stabilizer for improving heat resistant stability. However, when this resin composition is made into a molded article or exposed to high temperature during the compounding process with fillers or the molding process, there is a problem of generating black foreign materials in a molded article caused by the decomposition of stabilizer and the increase of the viscosity and the gelation of the liquid crystalline polyester.

Therefore, development of a liquid crystalline polyester resin composition capable of producing a molded article without making black foreign materials even if exposed to high temperature has been desired.

SUMMARY OF THE INVENTION

An object of the present invention is to provide a liquid crystalline polyester resin composition to produce a molded article without generating black foreign materials even if exposed to high temperature.

The present inventors have intensively studied to find a liquid crystalline polyester resin composition having no problems as described above, and resultantly found that a resin composition comprising a liquid crystalline polyester and a phosphite compound of the following formula (I) can produce a molded article without making black foreign materials even if exposed to high temperature, and then completed the present invention.

Namely, the present invention provides a liquid crystalline polyester resin composition comprising a liquid crystalline polyester and at least one phosphite compound of the formula (I):

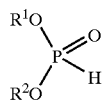

(I)

(wherein, $R^1$ represents a hydrogen atom or, an alkyl group having 1 to 4 carbon atoms or a phenyl group, and $R^2$ represents an alkyl group having 1 to 4 carbon atoms or a phenyl group)

DETAILED DESCRIPTION OF THE PRESENT INVENTION

The present invention will be described in detail below.

The liquid crystalline polyester used in the present invention is a polyester called thermotropic liquid crystalline polyester, and shows optical anisotropy in melting at temperatures of 450° C. or less.

The liquid crystalline polyester resins used for the present invention include, for example:

(1) a polymer comprising a repeating unit derived from aromatic hydroxycarboxylic acids, a repeating unit derived from aromatic dicarboxylic acids and a repeating unit derived from an aromatic diols, (2) a polymer comprising repeating units derived from different aromatic hydroxycarboxylic acids, (3) a polymer comprising a repeating unit derived from aromatic dicarboxylic acids and a repeating unit derived from aromatic diols, (4) a polymer prepared by reaction of polyesters such as polyethylene terephthalate and aromatic hydroxycarboxylic acids; and the like.

It is noted that in place of such aromatic hydroxycarboxylic acids, aromatic dicarboxylic acids or aromatic diols, ester formable derivatives thereof such as derivatives having ester forming property may be used.

The ester formable derivatives of a carboxylic acid may include, for example, those in which a carboxyl group is present in the form of an acid chloride or an acid anhydride so as to promote an ester formation reaction with high reactivity, or those in which a carboxyl group forms an ester with alcohols, ethylene glycol and the like so that a polyester is formed by a transesterification reaction.

The ester formable derivatives of a phenolic hydroxyl group may include, for example, those in which a phenolic hydroxyl group forms an ester with carboxylic acids so that polyester is formed by a transesterification reaction.

Aromatic hydroxycarboxylic acids, aromatic dicarboxylic acids and aromatic diols may also be substituted with a halogen atom such as chlorine, fluorine and the like, an alkyl group such as a methyl group, ethyl group and the like, an aryl group such as a phenyl group and the like, or other groups not disturbing their ester forming property.

Examples of repeating units constituting the liquid crystalline polyester include the following units.

Repeating units derived from aromatic hydroxycarboxylic acids:

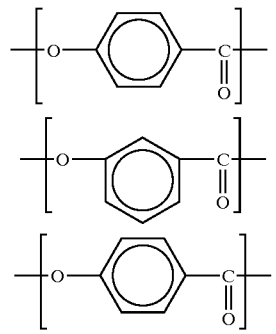

(A₁)

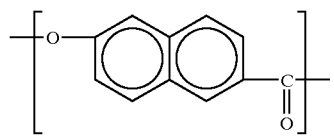

(A₂)

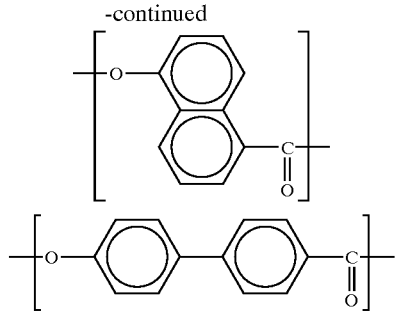

The above-mentioned repeating units may be substituted with a halogen atom or an alkyl group.

Repeating units derived from aromatic dicarboxylic acids:

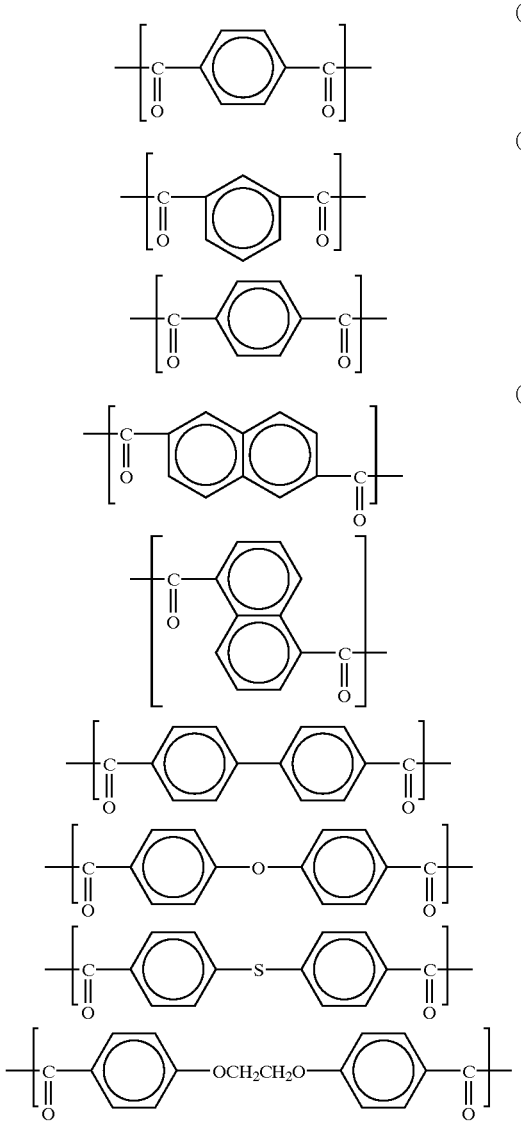

The above-mentioned repeating units may be substituted with a halogen atom, an alkyl group or an aryl group.

Repeating units derived from aromatic diols:

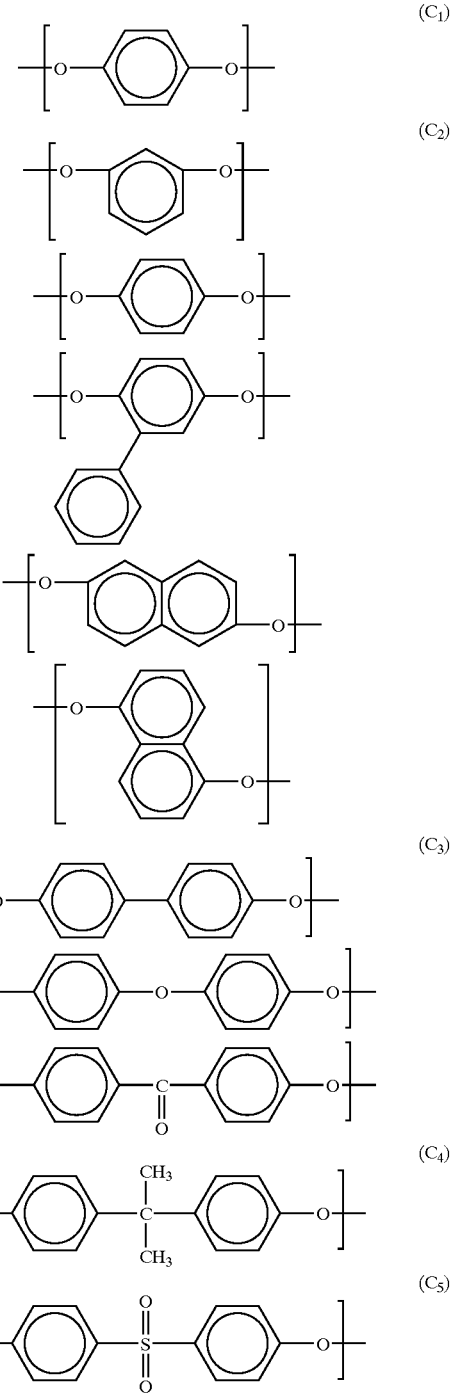

The above-mentioned repeating units may be substituted with a halogen atom, an alkyl group or an aryl group.

As the above-mentioned alkyl group, alkyl groups having 1 to 10 carbon atoms are preferable, and as the above-mentioned aryl group, aryl groups having 6 to 20 carbon atoms are preferable.

From a viewpoint of good balance of heat resistance, mechanical characteristics, and processibility, preferable are liquid crystalline polyesters containing at least 30% of the structural repeating unit of the above-described formula $A_1$.

Those having combinations of the repeating units as following (a) to (f) are preferable.

(a): a combination of ($A_1$), ($B_1$) and ($C_3$), or a combination of ($A_1$), a mixture of ($B_1$) and ($B_2$), and ($C_3$), (b): combination (a) in which ($C_3$) is partially or completely substituted by ($C_1$)

(c): combination (a) in which ($C_3$) is partially or completely substituted by ($C_2$)

(d): combination (a) in which ($C_3$) is partially or completely substituted by ($C_4$)

(e): combination (a) in which ($C_3$) is partially or completely substituted by a mixture of ($C_4$) and ($C_5$)

(f): combination (a) in which ($A_1$) is partially substituted by ($A_2$)

From the viewpoint of a liquid crystalline property, the preferable liquid crystalline polyesters are those comprising 30 to 80 mol % of a repeating unit derived from p-hydroxybenzoic acid, 10 to 35 mol % of a repeating unit derived from at least one compound selected from the group consisting of hydroquinone, resorcinol, 4,4'-dihydroxybiphenyl, bisphenol A and bisphenol S, and 10 to 35 mol % of a repeating unit derived from at least one compound selected from the group consisting of terephthalic acid, isophthalic acid and naphthalene dicarboxylic acid.

From the viewpoint of balance of heat resistance, the preferable liquid crystalline polyesters are those comprising 30 to 80 mol % of a repeating unit derived from p-hydroxybenzoic acid, 15 to 35 mol % of a repeating unit derived from 4,4'-dihydroxybiphenyl, and 15 to 35 mol % of a repeating unit derived from at least one compound selected from the group consisting of terephthalic acid and isophthalic acid.

From the viewpoint of balance of heat resistance and impact resistance, it is preferable that the liquid crystalline polyester used in the present invention contains at least 30 mol % of a repeating unit of the following formula.

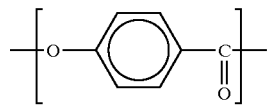

The weight-average molecular weight of the liquid crystalline polyester is not particularly limited and preferably from 10000 to 50000.

The method of producing the liquid crystalline polyester used in the present invention is not particularly limited and may include, for example, a method in which at least one compound selected from the group consisting of aromatic hydroxycarboxylic acids and aromatic diols is acylated with an excess amount of a fatty acid anhydride to obtain an acylated compound, and, by transesterifaction between the acylated compound and at least one compound selected from the group consisting of aromatic hydroxycarboxylic acids and aromatic dicarboxylic acids, the liquid crystalline polyester is produced. As the acylated compound, fatty acid esters obtained by previous acylation may also be used.

The use amount of a fatty acid anhydride in acylation is preferably from 1.05 to 1.1 times equivalent to that of the phenolic hydroxyl group, more preferably from 1.05 to 1.1 times equivalent to that of the phenolic hydroxyl group. If the adding amount of fatty acid anhydride is less than 1.0 equivalents of the phenolic hydroxyl group, the equilibrium of acylation shifts to the fatty acid anhydride, causing sublimation of the raw materials during transesterification (polycondensation) and clogging of the piping of such as reaction vessel, with the result that the reaction speed will decrease and sometimes the reaction will no longer advance.

If the adding amount of fatty acid anhydride is more than 1.2 equivalents, coloring of resultant liquid crystalline polyester may be more significant.

The acylation reaction is preferably conducted at about 130 to about 180° C. for about 5 minutes to about 10 hours, more preferably conducted at about 140 to about 160° C. for about 10 minutes to about 3 hours.

The fatty acid anhydride used in the acylation reaction is not particularly restricted, and include, for example, acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride and the like, and these may be used in admixture of two or more. From the viewpoints of its price and easy handling, acetic anhydride, propionic anhydride, butyric anhydride and isobutyric anhydride are preferable, and acetic anhydride is more preferably.

In transesterification, it is preferable that the amount of an acyl group in an acylated compound is 0.8 to 1.2 times equivalent to that of a carboxyl group.

Transesterification is preferably conducted while raising temperature from about 130 to about 400° C. at a rate of 0.1 to 50° C./min., and more preferably conducted while raising temperature from about 150 to about 350° C. at a rate of 0.3 to 5° C./min.

In transesterification of a carboxylic acid with a ester of fatty acid obtained by acylation, it is preferred that a fatty acid generated as a by-product and unreacted fatty acid anhydride are distilled off by means of a usual method such as distillation for the purpose of shifting the equilibrium.

The acylation reaction and transesterification may also be conducted in the presence of a catalyst. As the catalyst, those conventionally known as a catalyst for polymerization of a polyester can be used, and examples thereof include metal salt catalysts such as magnesium acetate, stannous acetate, tetrabutyl titanate, lead acetate, sodium acetate, potassium acetate, antimony trioxide and the like, organic compound catalysts such as N,N-dimethylaminopyridine, N-methylimidazole and the like. These catalysts are usually charged at the time of charging monomers, and are not necessarily removed after acylation, and when the catalysts are not removed, they can be used for transesterification.

Though polycondensation by transesterification is usually conducted by melt polymerization, melt polymerization and solid phase polymerization may be used together. It is preferable, in solid phase polymerization, that a polymer is extracted from a melt polymerization process, then, ground into powder form or flake form, then, subjected to a known solid phase polymerization method. For example, a method for solid polymerization include a method in which heat-treatment is conducted in solid phase at about 20 to about 350° C. under an inert atmosphere such as nitrogen for 1 to 30 hours. Solid phase polymerization may be conducted while stirring, or conducted in static condition without stirring. Further, melt polymerization and solid phase polymerization may also be conducted in the same reaction vessel by providing a suitable stirring mechanism. After solid phase polymerization, the resulted liquid crystalline polyester can be palletized and molded by known methods.

Production of a liquid crystalline polyester can be conducted using, for example, a batch-wise apparatus, continuous apparatus and the like.

To the liquid crystalline polyester thus obtained, a phosphite compound of the general formula (I) is added.

(I)

In the formula, $R^1$ represents a hydrogen atom or an alkyl group having 1 to 4 carbon atoms or a phenyl group, and $R^2$ represents an alkyl group having 1 to 4 carbon atoms or a phenyl group.

The alkyl group having 1 to 4 carbon atoms include, for example, a methyl group, ethyl group, n-propyl group, isopropyl group, n-butyl group, isobutyl group, sec-butyl group, tert-butyl group and the like, and a methyl group and an ethyl group are preferable.

The phosphite compound of the formula (I) includes, for example, alkyl phophites such as dimethyl phosphite, diethyl phosphite, dipropyl phosphite, methyl ethyl phosphite, diphenyl phosphite, methyl phenyl phosphite. Among these compounds, dimethyl phosphite, diethylphosphite and diphenyl phosphite are preferable. Further, diphenyl phosphite is more preferable from the viewpoint of boiling point and easy handling.

The amount of the phosphite compound in the liquid crystalline polyester resin composition of the present invention is preferably from 0.01 part by weight to 0.2 parts by weight, more preferably from 0.1 to 0.15 parts by weight, based on 100 parts by weight of a liquid crystalline polyester. When the amount of the phosphite compound is less than 0.01 part by weight, an effect in heat resistance stability may not be sufficient, and when the amount is 0.2 parts by weight or more, blister may occur during a process of a solder welding of molded article.

In the liquid crystalline polyester resin composition of the present invention, fillers such as inorganic fillers or organic fillers may be added in order to improve mechanical strength. Inorganic fillers may include, for example, fibrous fillers, granular fillers, tabular fillers and the like.

The fibrous inorganic filler include, for example, fibrous substances of metals such as aluminum, titanium, copper and the like, glass fiber, asbestos fiber, silica fiber, silica alumina fiber, potassium titanate fiber, carbon fiber, graphite fiber and the like, and glass fiber is preferable.

The granular inorganic filler include, for example, silicates such as calcium silicate, aluminum silicate, talc, clay, diatomaceous earth, wollastonite and the like, various metal powders of iron oxide, titanium oxide, zinc oxide, antimony trioxide, alumina, calcium sulfate and the like, carbon black, graphite, silica, quartz powder, glass bead, milled glass fiber, glass balloon, glass powder and the like.

The tabular in organic filler include, for example, mica, glass flake, various metal foils and the like.

The organic filler include, for example, heat resistant high strength fibers composed of aromatic polyesters, aromatic polyimides, polyamides and the like.

These fillers may be previously treated with a conventionally known surface treatment agent before use, if necessary. Further, when the fibrous filler is used, convergent reagents and the like may be used.

When fillers are added, the amount thereof is preferably from 10% by weight to 80% by weight, more preferably from 10% by weight to 70% by weight, based on the whole composition.

When fillers are added in an amount of over 80% by weight, mechanical strength maybe deteriorated. The method of adding filler is not particularly restricted, and known methods can be employed.

To the liquid crystalline polyester resin composition of the present invention, various additives such as conventionally known antioxidants, reinforcing agents, pigments, reinforcing agents, augmentation agents, heat stabilizers and the like may be added in adequate amount. The above-mentioned fillers and additives may be used in combination of two or more.

To the liquid crystalline polyester resin composition of the present invention, thermoplastic resins such as polypropylene, polyamides, polyesters, polyphenylene sulfide, polyether ketone, polycarbonates, polyether sulfone, polyphenyl ether and modified substances thereof, polyether imides and the like, thermosetting resins such as phenol resins, epoxy resins, polyimide resins, cyanate resins and the like, may be added singly or in combination of two or more, in an amount not disturbing the object of the present invention.

The liquid crystalline polyester resin composition of the present invention can be molded into molded articles such as fibers, films, three dimensional molded articles, vessels, hoses and the like by melt molding such as, for example, extrusion molding, injection molding, compression molding, blow molding and the like.

Thus obtained molded article can be heat-treated to improve its mechanical strength and elastic modulus.

The heat-treatment can be conducted by heating a molded article at temperatures not higher than the melting point of the liquid crystalline polyester resin used in an inert atmosphere (for example, nitrogen, argon, helium and the like), in an oxygen-containing atmosphere (for example, air), or under reduced pressure.

EXAMPLES

The present invention will be illustrated based on the following examples, but it is needless to say that the scope of the present invention is not limited to the examples.

The properties of a liquid crystalline polyester resin were evaluated by the following methods.

Properties of Resin (1) Existence of Black Foreign Material

A flat plate of 64 mm square and 3 mm thickness was molded and the existence of black points was checked.

(2) Stability of Melt Viscosity (Index of Heat Resistant Stability)

Using a control stress rheometer CVO manufactured by Bohlin Instruments, the change by time of melt viscosity was measured under the following conditions. When the change by time of melt viscosity is smaller, heat resistance stability is more excellent.

Temperature: 410° C.

Atmosphere: nitrogen 200 ml/min

Measurement time: 1 hour

Geometry: cone plate 5.4°/25φ

Measurement frequency: 1 Hz

Pre-Shear: OFF

Target Strain: 0.01

Mode: Auto

Example 1

Into a reactor equipped with a stirrer, torque meter, nitrogen gas introducing tube, thermometer and reflux condenser was charged 1064 g (7.7 mol) of p-hydroxybenzoic acid, 307 g (1.65 mol) of 4,4'-dihydroxybiphenyl, 260.8 g (1.57 mol) of terephthalic acid, 13.2 g (0.08 mol) of isophthalic acid and 1235 g (12.1 mol) of acetican hydride. The atmosphere in the reactor was thoroughly purged with a nitrogen gas, then, the mixture was heated up to 150° C. over 15 minutes under a nitrogen gas flow, and refluxed for 3 hours while maintaining the temperature.

Thereafter, the mixture was heated up to 320° C. over 2 hours and 50 minutes while distilling the by-produced acetic acid and unreacted acetic anhydride, and a point at which increase in torque was recognized was regarded as the end of the reaction, and the content was taken out. The resulted solid component was cooled to room temperature, ground by a fine grinder, then, heated from room temperature up to 250° C. over 1 hour under a nitrogen atmosphere, and heated from 250° C. to 323° C. over 5 hours, maintained at 323° C. for 3 hours, to progress a polymerization reaction in solid phase. As a result of observation of a polarization microscope, the resulted resin showed optical anisotropy in melting (410° C.).

To the resulted resin was compounded 0.05% by weight of a phosphite compound (following formula (II)), then, milled glass manufactured by Asahi Glass Co., Ltd. (REV-8) was compounded and mixed so that the its content was 40% by weight based on the whole composition, then, granulated at 390° C. using a twin-screw extruder (PCM-30 manufactured by Ikegai Co., Ltd.). The resulted pellets were injection-molded using PS40E5ASE injection molding machine manufactured by Nissei Plastics Industrial Co., Ltd. at a cylinder temperature of 400° C. and a mold temperature of 130° C., and the properties of the resin (existence of black foreign material, stability of melt viscosity) were evaluated. The results are shown in Table 1.

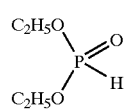

(II)

Example 2

The same procedure as in Example 1 was repeated except a phosphite compound (formula (III)) was used, and the properties of the resin (existence of black foreign material, stability of melt viscosity) were evaluated. The results are shown in Table 1.

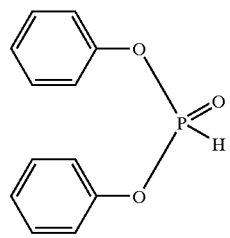

(III)

Comparative Example 1

The same procedure as in Example 1 was repeated except a phosphite compound was not used, and the properties of the resin (existence of black foreign material, stability of melt viscosity) were evaluated. The results are shown in Table 1.

Comparative Example 2

The same procedure as in Example 1 was repeated except Adeka Stab PEP-8 manufactured by Asahi Denka Co., Ltd. (following formula (IV)) was used as the phosphite compound, and the property of the resin (existence of black foreign material) was evaluated. The results are shown in Table 1.

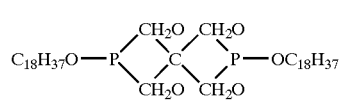

(IV)

Comparative Example 3

The same procedure as in Example 1 was repeated except Adeka Stab PEP-36 manufactured by Asahi Denka Co., Ltd. (following formula (V)) was used as the phosphite compound, and the property of the resin (existence of black foreign material) was evaluated. The results are shown in Table 1.

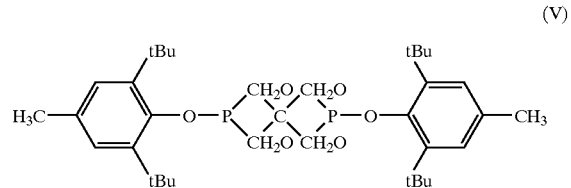

(V)

Comparative Example 4

The same procedure as in Example 1 was repeated except 2,2'-methylenebis(4,6-di-t-butylphenyl)octyl phosphite (following formula (VI)) was used as the phosphite compound, and the property of the resin (existence of black foreign material) was evaluated. The results are shown in Table 1.

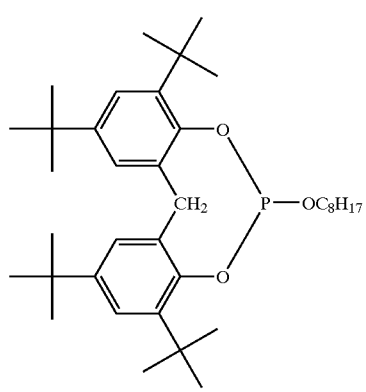

(VI)

TABLE 1

|  | Example | | Comparative example | | | |
|---|---|---|---|---|---|---|
|  | 1 | 2 | 1 | 2 | 3 | 4 |
| Phosphite compound | Formula II | Formula III | None | Adeka Stab PEP-8 | Adeka Stab PEP-36 | 2,2'-methyl-enebis(4,6-di-t-butyl-phenyl) octyl phosphite |

TABLE 1-continued

|  | Example | | Comparative example | | | |
|---|---|---|---|---|---|---|
|  | 1 | 2 | 1 | 2 | 3 | 4 |
| existence of black foreign material *) | ○ | ○ | ○ | X | X | X |
| Melt viscosity **) | | | | | | |
| 1 min. | 3500 | 3000 | 72000 | | | |
| 10 min. | 60000 | 43000 | 19300 | | | |
| 30 min. | 242000 | 208000 | 0 | | | |
| 60 min. | 325000 | 311000 | 48400 | 0 | 71300 | 0 |

*) Number of black points observed on the surface of one flat plate 0: ○, 1 to 5: Δ, 6 to 10: X
**) Value at 410° C. (Pas)

According to the present invention, a liquid crystalline polyester resin composition capable of producing a molded article without making black foreign materials even exposed to high temperature can be provided.

What is claimed is:

1. A liquid crystalline polyester resin composition comprising a liquid crystalline polyester and at least one phosphite compound of the formula (I):

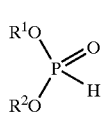

(I)

wherein, $R^1$ represents a hydrogen atom or, an alkyl group having 1 to 4 carbon atoms or a phenyl group, and $R^2$ represents an alkyl group having 1 to 4 carbon atoms or a phenyl group.

2. The liquid crystalline polyester resin composition according to claim 1, wherein the liquid crystalline polyester is a liquid crystalline polyesters comprising a repeating unit derived from aromatic hydroxycarboxylic acids, a repeating unit derived from aromatic diols, and repeating unit derived from aromatic dicarboxylic acids.

3. The liquid crystalline polyester resin composition according to claim 2, wherein the aromatic hydroxycarboxylic acid is p-hydroxybenzoic acid, the aromatic diol is at least one compound selected from the group consisting of hydroquinone, resorcinol, 4,4'-dihydroxybiphenyl, bisphenol A and bisphenol S, and the aromatic dicarboxylic acid is at least one compound selected from the group consisting of terephthalic acid, isophthalic acid and naphthalene dicarboxylic acid.

4. The liquid crystalline polyester resin composition according to claim 3, wherein the repeating unit derived from p-hydroxybenzoic acid is from 30 to 80 mol %, the repeating unit derived from 4,4'-dihydroxybiphenyl is from 10 to 35 mol %, and the repeating unit derived from at least one compound selected from the group consisting of terephthalic acid, and isophthalic acid is from 10 to 35 mol %.

5. The liquid crystalline polyester resin composition according to claim 1, wherein the liquid crystalline polyester is obtained by a method comprising acylatation of at least one compound selected from the group consisting of aromatic hydroxycarboxylic acids and aromatic diols with a fatty acid anhydride to obtain an acylated compound, and transesterifaction of the acylated compound and at least one compound selected from the group consisting of aromatic hydroxycarboxylic acids and aromatic dicarboxylic acids.

6. The liquid crystalline polyester resin composition according to claim 1, wherein the amount of the phosphite compound is from 0.01 part by weight to 0.2 parts by weight based on 100 parts by weight of the liquid crystalline polyester.

7. The liquid crystalline polyester resin composition according to claim 6, wherein the amount of the phosphite compound is from 0.1 to 0.15 parts by weight based on 100 parts by weight of the liquid crystalline polyester.

8. The liquid crystalline polyester resin composition according to claim 1, wherein the phosphite compound is alkyl phophite compound.

9. The liquid crystalline polyester resin composition according to claim 8, wherein the alkyl phosphite compound is at least one compound selected from the group consisting of dimethyl phosphite, diethyl phosphite, dipropyl phosphite, methyl ethyl phosphite, diphenyl phosphite, methyl phenyl phosphite.

10. The liquid crystalline polyester resin composition according to claim 9, wherein the alkyl phosphite compound is at least one compound selected from the group consisting of dimethyl phosphite, diethyl phosphite and diphenyl phosphite are preferable.

11. The liquid crystalline polyester resin composition according to claim 10, wherein the alkyl phosphite compound is diphenyl phosphite.

12. The liquid crystalline polyester resin composition according to claim 1, wherein the composition further comprises fillers.

13. The liquid crystalline polyester resin composition according to claim 12, wherein the fillers is inorganic filler or organic fillers.

14. A molded article comprising the liquid crystalline polyester resin composition according to claim 1.

* * * * *